: 3,399,234
PROCESS FOR PREPARING N-FLUORO
(POLYFLUOROALKYL) KETIMINES
Joseph La Mar Zollinger, Woodbury Township, Washington County, Minn., assignor to Minnesota Mining and Manufacturing Company, St. Paul, Minn., a corporation of Delaware
No Drawing. Filed Mar. 22, 1966, Ser. No. 536,276
2 Claims. (Cl. 260—566)

ABSTRACT OF THE DISCLOSURE

Process for the production of fluorimino group containing compounds, which consists in direct fluorination of a compound of the formula $$R_f^1 R_f^2 C=NH$$

wherein $R_f^1$ and $R_f^2$ are the same or different polyfluoroalkyl radicals having from 1 to 12 carbon atoms, to form an intermediate monofluorimino group of the formula $$R_f^1 R_f^2 CFNFH$$

followed by reacting the compounds with an alkali metal fluoride, to remove hydrogen fluoride therefrom and produce a compound having the formula $$R_f^1 R_f^2 C=NF$$

---

This invention relates to certain fluorinated organic nitrogen compounds and more particularly to a process for their production.

Disubstituted fluorinated imines have been produced by the reaction of NF$_3$ with perfluorinated olefins at high temperatures. In this process there are usually numerous products, and the yield of the disubstituted fluorimine is generally low.

It is an object of the invention to provide an improved process for the synthesis of fluorimino-substituted polyfluoroalkanes. In accordance with this object, certain ketimino-group-containing starting materials are subjected to direct fluorination.

Broadly speaking, the new process involves the controlled fluorination of polyfluoroalkyl ketimines of the general formula $$R_f^1 R_f^2 C=NH$$

to yield $$R_f^1 R_f^2 CFNFH$$

resulting from the addition of fluorine across the double bond of the ketimine. Treatment of this intermediate with a dehydrofluorinating agent affords a nearly quantitative yield of the corresponding N-fluoro(polyfluoroalkyl)ketimine $$R_f^1 R_f^2 C=NF$$

In these and subsequent formulae and equations, $R_f^1$ and $R_f^2$ are the same or different polyfluoroalkyl radicals having from 1 to 12 carbon atoms. Preferably these have had most of their hydrogen atoms replaced by fluorine. They may contain other halogens, e.g., chlorine.

The sequence of reactions is summarized:

$$R_f^1 R_f^2 C=NH \xrightarrow{F_2} R_f^1 R_f^2 CFNFH \xrightarrow{-HF} R_f^1 R_f^2 C=NF$$

The fluorination is conveniently carried out in borosilicate glass reactors or in fluorine-resistant metal vessels at temperatures 80° to 120° C. below the normal boiling point of the starting imine, but in any case not above 25° C. (i.e., from about —100° to 25° C.), and usually without a solvent. Inert solvents, e.g., fully fluorinated alkanes, cycloalkanes, ether, etc. can be used if desired.

A 1 to 20 volume percent fluorine gas stream, using nitrogen or other inert fluid as the diluent, is passed into the reactor at a rate of 25 to 150 ml. per minute, and any gaseous products are trapped from the copper exit line at —183° C. (liquid oxygen). A two to fourfold molar excess of fluorine is delivered. At the higher fluorine concentrations, it is desirable to dissolve the imine in a solvent resistant to fluorination such as a fluorocarbon solvent or acetonitrile.

The intermediate NFH group-substituted compound which is formed is volatilized and treated with a dehydrofluorinating agent. For example, the gaseous material can be passed through an alkali metal fluoride bed such as sodium fluoride to remove hydrogen fluoride as shown above, whereupon the ketimino-group substituted product is obtained. If the products are higher-boiling, they may be stirred with the dehydrofluorinating agent in powdered form.

Alternatively, the intermediate may be left in a glass reactor overnight at room temperature to effect the same transformation, i.e., a reaction with the alkali metal oxides in glass causes the loss of hydrogen fluoride. This may be especially advantageous if solvent is used or the NFH compound is high boiling.

The advantages of the process of the invention include higher conversions and shorter reaction times in obtaining the desired compounds as compared to known procedures.

The $R_f^1 R_f^2 C=NF$ products are isolated and purified by gas chromatography or distillation. They have useful oxidizing power and are also intermediates for preparation of other chemical compounds, as they undergo nucleophilic addition reactions.

Great care should be used in the handling of fluorine because of its great reactivity and oxidizing power. The NF products of this invention are also oxidizers and may be toxic and therefore should be handled with caution.

Substituted ketimines suitable as starting materials are obtained by known methods, e.g., by the reaction of ammonia with polyfluorinated ketones, followed by dehydration of the intermediate.

$$R_f^1 R_f^2 C=O + NH_3 \xrightarrow{\text{pyridine}} R_f^1 R_f^2 C\underset{|}{\overset{OH}{-}}NH_2 \xrightarrow{POCl_3} R_f^1 R_f^2 C=NH$$

Fluorine and proton nuclear magnetic resonance (F and H n.m.r.) data reported in the examples employ CFCl$_3$ as internal reference for F n.m.r. ($\phi$ values) and Si(CH$_3$)$_4$ as internal reference for H n.m.r. ($\tau$ values).

Example 1

The reaction vessel consists of a dry borosilicate glass cylinder of about 15 ml. capacity which has a glass neck closed with a polytetrafluoroethylene needle valve. Using reduced pressure, 2.0 gm. (12 millimoles) of hexafluoroisopropylidenimine, (CF$_3$)$_2$C=NH, are transferred into this reactor.

The reactor is cooled to —78° C. (solid carbon dioxide-trichloroethylene slush) and purged with nitrogen for a few minutes at atmospheric pressure. A premixed 5 percent fluorine-95 percent nitrogen stream from a stainless steel cylinder is introduced via a stainless steel tube terminating just above the imine, at a rate of 50–60 ml. per minute, until 30 milli-moles of fluorine have been delivered (about 5 hours). The gaseous products (about 1.3 millimoles) are collected in a glass trap cooled to —183° C. (liquid oxygen).

The fluorine nulcear magnetic resonance (F n.m.r.) spectrum of the mixture indicates the presence of equimolar amounts of N-fluoro(hexafluoroisopropyliden)imine, (CF$_3$)$_2$C=NF (I), and N,N-difluoro(perfluoroisopropyl)amine, (CF$_3$)$_2$CFNF$_2$ (II). The F n.m.r. spectrum of I shows two double quartets centered at 63.9 and 67.3$\phi$ due to the CF$_3$ groups and a broad peak at —48.7$\phi$ for the NF function. The area ratio is 3:3:1. The F n.m.r. spectrum of II consists of a double doublet centered at 74.1φ (CF₃), a sharp peak at 170.5φ (CF) and a broad absorption at −22.8φ (NF₂) in an area ratio of 6:1:2.

Chromatographic separation is accomplished at room temperature on an 18 ft. x ½ in. column packed with an acid-washed diatomaceous earth (Chromasorb P) coated with 33 percent by weight of a tetramer of chlorotrifluoroethylene. The flow of helium carrier gas is 210 ml. per minute. Under these conditions, (CF₃)₂C=NF (B.P. −12° C.) elutes at 5.35 min., (CF₃)₂CFNF₂ (B.P. 0° C.) elutes at 6.35 min., and a reference compound, CF₂Cl₂, elutes at 6.2 minutes.

The reactor contains about 7.5 millimoles of liquid product which consists mainly of (CF₃)₂CFNFH (III, B.P. about 45° C.) as shown by infrared, mass spectral and nuclear magnetic resonance spectra. The molecular weight from mass spectral effusion rates is 203; theory for C₃HF₈N is 203.

The F n.m.r. spectrum of III consists of a double doublet centered at 75.9φ for CF₃, a double doublet at 151.2φ (CR) further split into seven-fold peaks, and a double doublet at 134.9φ (NFH) also further split into seven-fold peaks. The area ratio is 6:1:1. The proton nuclear magnetic resonance spectrum of III shows a single peak at 1.97τ due to the H of the NFH function.

The NFH compound III is converted essentially quantitatively to I by the elimination of hydrogen fluoride. This is accomplished at room temperature (about 24° C.) on a vacuum transfer system by passing III (7.5 millimoles) as a gas through a 5/16 in. x 18 in. bed of ⅛ in. sodium fluoride pellets in a U tube over a period of about 3 minutes. Sodium hydrogen fluoride is formed on the surface of the pellets and the gaseous product I (7.4 millimoles) is collected in a trap at −196° C. (liquid nitrogen). It is nearly pure but may be purified further and separated from small amounts of II and other impurities by gas chromatography as described above.

Alternatively, I is obtained by allowing III to stand overnight at room temperature in the glass reactor or other glass vessel.

Example 2

The reaction vessel described in Example 1 is used; and 1.8 gm. (10 millimoles) of chloropentafluoroisopropylidenimine are transferred as described.

The reactor is cooled in a bath maintained at about −60° C. with a chloroform slush or a thermostatically controlled system using liquid nitrogen as the coolant. After purging with nitrogen, the imine is fluorinated with a 5 percent fluorine-95 percent nitrogen gas stream, as described in Example 1, until 25 millimoles of fluorine have been used.

The reactor contents consist chiefly of $$ClCF_2CF(CF_3)NFH$$

which is vaporized by slightly warming the reactor and passed through a bed of sodium fluoride pellets, to yield the desired N - fluoro(chloropentafluoroisopropyliden)imine, ClCF₂C(CF₃)=NF, B.P. about 20° C. This product is purified by gas chromatography.

Example 3

Into the reaction vessel described in Example 1 are placed 2.0 gm. (10 millimoles) of 1,3-dichlorotetrafluoroisopropylidenimine. The reactor is cooled in a bath maintained at about −40° C. and the imine is fluorinated with 25 millimoles of fluorine as dilute gas stream (3 percent F₂, 97 percent nitrogen).

The glass reactor is closed, allowed to stand overnight at room temperature, and then the desired product, N - fluoro-(1,3 - dichlorotetrafluoroisopropyliden)imine, (ClCF₂)₂C=NF, B.P. about 50° C., is separated from the reaction products using gas chromatography.

What is claimed is:

1. The process for the production of fluorimines, which comprises the steps of subjecting to the action of fluorine in 1 to 20 percent concentration in an inert carrier and at a temperature below about 25° C. a compound of the formula $$R_f^1 R_f^2 C=NH$$

wherein $R_f^1$ and $R_f^2$ are the same or different polyfluoroalkyl radicals having from 1 to 12 carbon atoms, to form a compound of the formula $$R_f^1 R_f^2 CFNFH$$

wherein $R_f^1$ and $R_f^2$ have the same significance as above, and treating the said —NFH group-containing compound with an alkali metal fluoride to remove HF therefrom.

2. The process according to claim 1, in which the fluorination step is carried out in an inert solvent.

References Cited

Mitsch: "Journal American Chemical Society," vol. 87, pp. 328–333 (1965).

CHARLES B. PARKER, *Primary Examiner.*

ROBERT V. HINES, *Assistant Examiner.*